(12) United States Patent
Wang et al.

(10) Patent No.: US 11,054,666 B2
(45) Date of Patent: Jul. 6, 2021

(54) LENS DEVICE AND LENS FOCUSING METHOD

(71) Applicant: Chicony Electronics Co., Ltd., New Taipei (TW)

(72) Inventors: Tsung-You Wang, New Taipei (TW); Jin-Kae Jang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 63 days.

(21) Appl. No.: 16/232,429

(22) Filed: Dec. 26, 2018

(65) Prior Publication Data
US 2020/0089018 A1   Mar. 19, 2020

(30) Foreign Application Priority Data
Sep. 17, 2018   (TW) .................................. 107132702

(51) Int. Cl.
*B32B 41/00*   (2006.01)
*G02B 27/62*   (2006.01)

(52) U.S. Cl.
CPC .................................... *G02B 27/62* (2013.01)

(58) Field of Classification Search
CPC ........................................................ G02B 27/62
USPC ................... 156/60, 64, 350, 351, 378, 379
See application file for complete search history.

(56) References Cited

U.S. PATENT DOCUMENTS

2015/0174715 A1\* 6/2015 Kang ..................... G03B 43/00
29/407.04
2017/0052385 A1\* 2/2017 Wu ...................... H04N 5/2253

FOREIGN PATENT DOCUMENTS

CN              2636263 Y       8/2004

\* cited by examiner

*Primary Examiner* — Michael N Orlando
*Assistant Examiner* — Joshel Rivera
(74) *Attorney, Agent, or Firm* — Muncy, Geissler, Olds & Lowe, P.C.

(57) ABSTRACT

A lens device includes a hollow base, a calibration ring, and a lens assembly. The hollow base includes a bottom surface and an assembly plane opposite to the bottom surface. The assembly plane has a through hole. The calibration ring includes a shaft hole, a first annular surface, and a second annular surface axially opposite to the first annular surface. An inner wall of the shaft hole has an internal thread. The shaft hole corresponds to the through hole of the hollow base. The second annular surface is fixed on the assembly plane of the hollow base via a curing adhesive layer. The lens assembly includes a lens barrel. The lens barrel has an external thread. The lens barrel is screwed to the internal thread of the calibration ring by the external thread.

19 Claims, 6 Drawing Sheets

LENS DEVICE AND LENS FOCUSING METHOD

CROSS-REFERENCE TO RELATED APPLICATION

This non-provisional application claims priority under 35 U.S.C. § 119(a) to Patent Application No. 107132702 filed in Taiwan, R.O.C. on Sep. 17, 2018, the entire contents of which are hereby incorporated by reference.

BACKGROUND

Technical Field

The instant disclosure relates to an optical device and, more particularly, to a lens device and a lens focusing method.

Related Art

Along with the development of technology, many electronic products (e.g., smart phones, tablet computers, cameras, or dashboard cameras) are provided with lens devices to capture images outside the electronic products.

In general, the most important aspect of a lens device is about the resolution of captured images. To reach the objective, an active alignment focusing method is usually adopted to make a lens device focused in a manufacturing process of the lens device. The active alignment focusing method mainly includes: positioning a lens on a support base, adjusting a relative position of the lens and the support base to have the lens focused, and finally adhering the lens with the support base. However, under the circumstances that the focusing process by the focusing method is done, if certain situations of the lens such as focus failure or damage occur, the entire lens has to be discarded since the lens and the support base are fixed to each other; therefore, the cost is increased.

SUMMARY

To address the above issue, in an embodiment, a lens device is provided, which comprises a hollow base, a calibration ring, and a lens assembly. The hollow base comprises a bottom surface and an assembly plane opposite to the bottom surface. The assembly plane has a through hole. The calibration ring comprises a shaft hole, a first annular surface, and a second annular surface axially opposite to the first annular surface. An inner wall of the shaft hole has an internal thread. The shaft hole corresponds to the through hole of the hollow base. The second annular surface is fixed on the assembly plane of the hollow base via a curing adhesive layer. The lens assembly comprises a lens barrel. The lens barrel has an external thread. The lens barrel is screwed to the internal thread of the calibration ring by the external thread.

In an embodiment, a lens focusing method is provided, which comprises a calibration procedure: preparing a hollow base, a calibration ring, and a lens assembly, the hollow base comprising a bottom a bottom surface and an assembly plane opposite to the bottom surface, the assembly plane having a through hole, the calibration ring comprising a shaft hole, a first annular surface, and a second annular surface axially opposite to the first annular surface, an inner wall of the shaft hole having an internal thread, the lens assembly comprising a lens barrel, the lens barrel having an external thread, the lens barrel being screwed to the internal thread of the calibration ring by the external thread, the shaft hole of the calibration ring corresponding to the through hole of the hollow base, and the calibration ring being adjusted related to the hollow base to a calibrated position and being fixed on the assembly plane of the hollow base by the second annular surface via a curing adhesive layer; a detection procedure: detecting the calibrated position to determine whether the lens assembly is at a focus position; a focus procedure: while the lens assembly is not at the focus position, rotating the lens assembly related to the calibration ring to have the lens assembly moved axially to the focus position; and an adhering procedure: filling an adhesive between the external thread and the internal thread to fix the lens assembly and the calibration ring.

Concisely, according to the embodiments of the lens device and the lens focusing method of the instant disclosure, the lens barrel of the lens assembly is screwed to the internal thread of the calibration ring by the external thread, such that the calibration ring is adjusted to a calibrated position and is fixed on the assembly plane of the hollow base. As a result, while the calibrated position does not make the lens assembly be at the focus position, the lens assembly can still be rotated related to the calibration ring, such that the lens assembly can be moved related to the calibration ring and the hollow base to adjust the focus. Alternatively, while the lens assembly damages, the lens assembly can be rotated and detached related to the calibration ring and can be replaced by a new lens assembly. There is no need to discard the entire lens device; therefore, the cost can be decreased.

DETAILED DESCRIPTION

Figure 1:
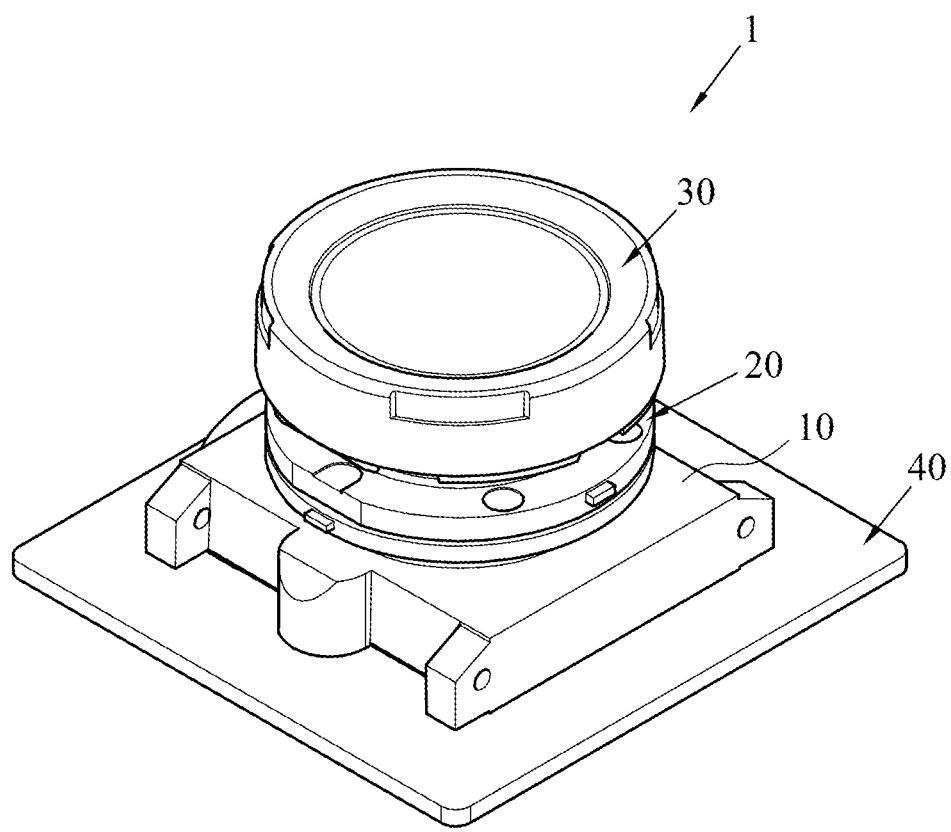
FIG. 1 illustrates a perspective view of a lens device according to an embodiment of the instant disclosure.
Figure 2:
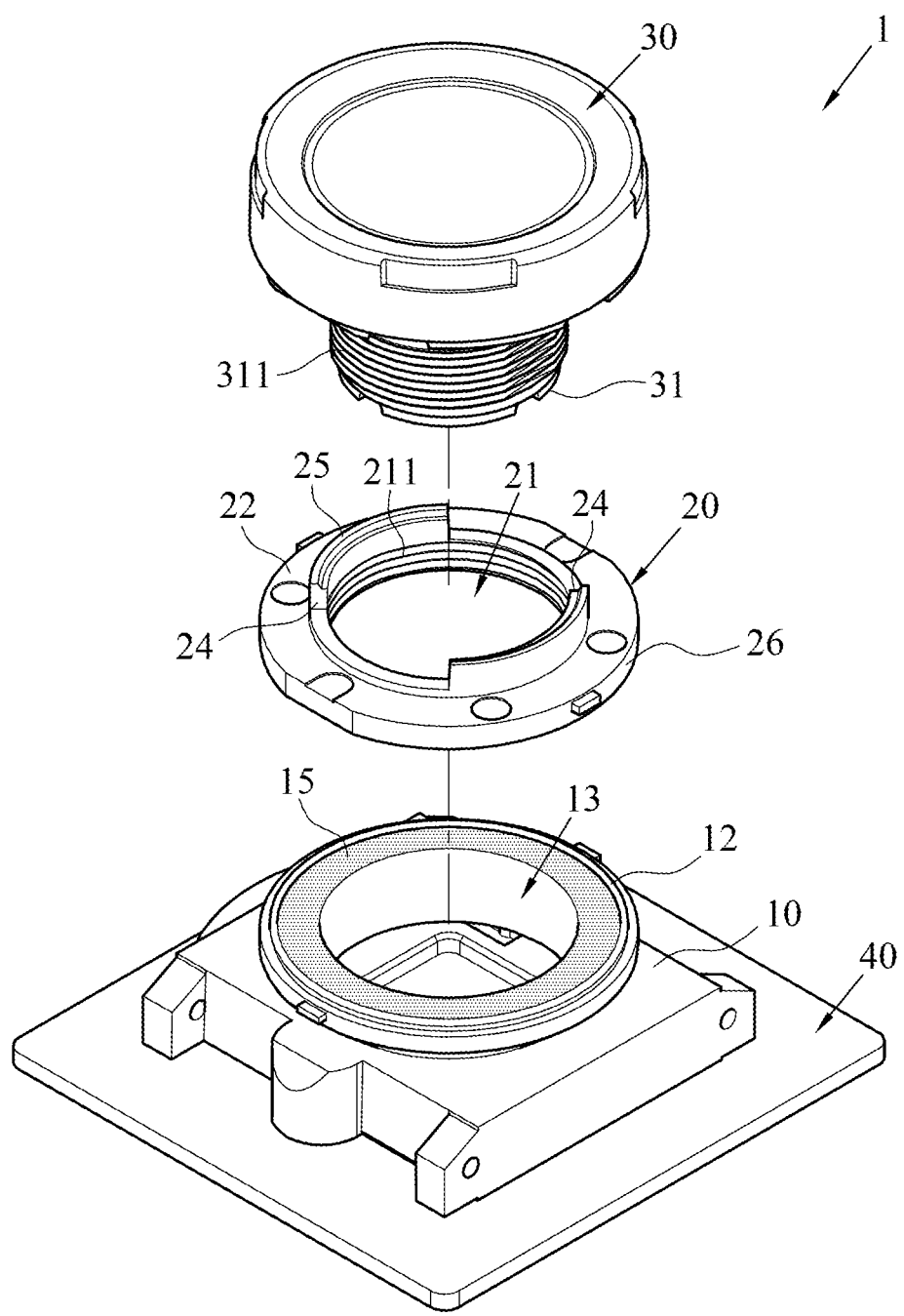
FIG. 2 illustrates an exploded view of the lens device according to an embodiment of the instant disclosure.
Figure 3:
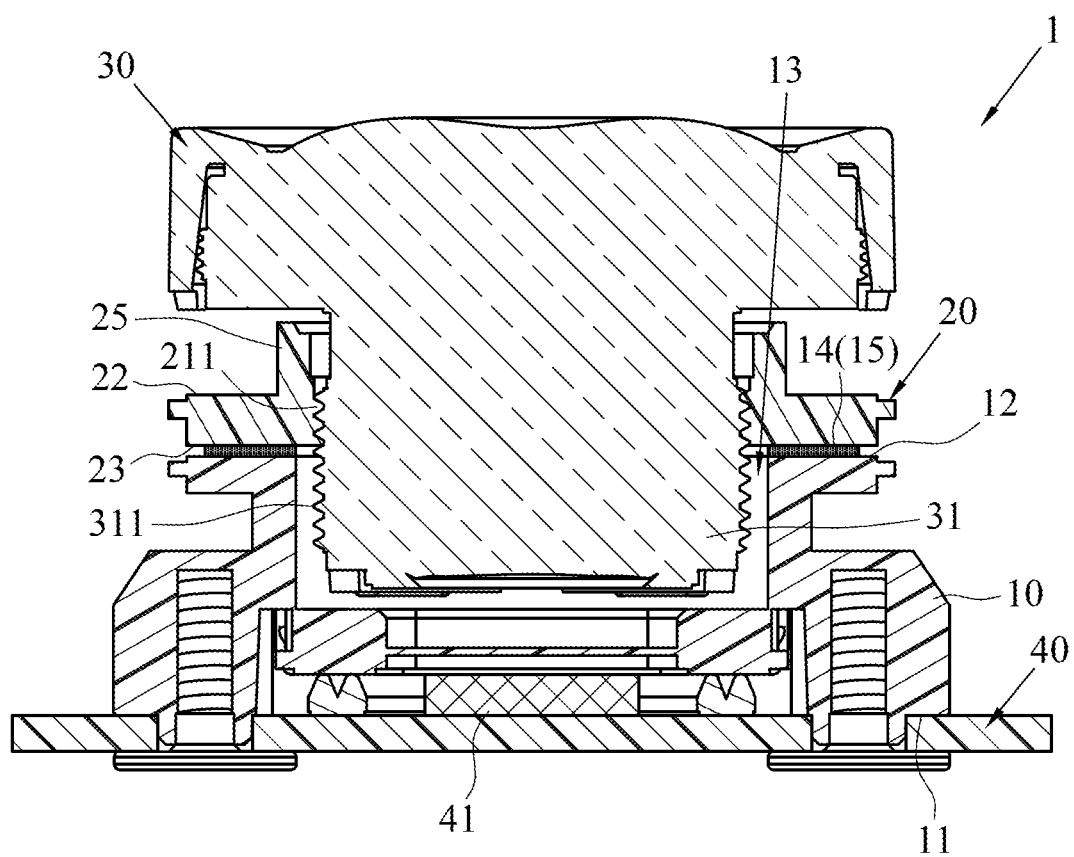
FIG. 3 illustrates a cross sectional view of the lens device according to an embodiment of the instant disclosure.

FIG. 1 is a perspective view of a lens device according to an embodiment of the instant disclosure. FIG. 2 is an exploded view of the lens device according to an embodiment of the instant disclosure. FIG. 3 is a cross sectional view of the lens device according to an embodiment of the instant disclosure. As shown in FIG. 1 and FIG. 2, in the embodiment, the lens device 1 comprises a hollow base 10, a calibration ring 20, a lens assembly 30, and a circuit board 40. In some embodiments, the lens device 1 can be applied to an electronic product to capture images. For example, the lens device 1 can be an image capturing lens device of an electronic product such as a smart phone, a tablet computer, a laptop computer, or a camera.

As shown in FIG. 3, the hollow base 10 is fixed on the circuit board 40. Wherein, a surface of the circuit board 40 has a light sensing component 41 disposed thereon. The light sensing component 41 is in the hollow base 10. In the embodiment, the hollow base 10 comprises a bottom surface 11 and an assembly plane 12 opposite to each other. The hollow base 10 is fixed on the circuit board 40 by the bottom surface 11. The assembly plane 12 has a through hole 13. The through hole 13 communicates with the surface of the circuit board 40. The light sensing component 41 is in the through hole 13. In some embodiment, the light sensing component 41 may be a charge-coupled device (CCD), a complementary metal-oxide semiconductor (CMOS), or CMOS active pixel sensor.

As shown in FIG. 3, the calibration ring 20 and the lens assembly 30 of the lens device 1 are installed to the assembly plane 12 of the hollow base 10. A distance between the lens assembly 30 and the light sensing component 41 is adjusted by the calibration ring 20, such that the lens assembly 30 can be fixed to a predetermined focus position. Wherein, based upon the focus position, a predetermined imaging focus between the lens assembly 30 and the light sensing component 41 can be maintained, such that a desired image quality can be achieved. Procedures of a lens focusing method according to the embodiments of the instant disclosure are illustrated corresponding to the drawings as follows.

Figure 4:
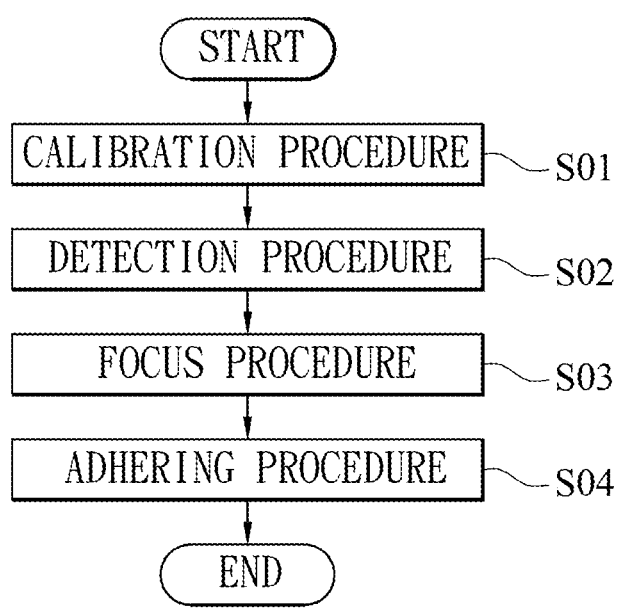
FIG. 4 illustrates a flow chart of a lens focusing method according to an embodiment of the instant disclosure.
Figure 5:
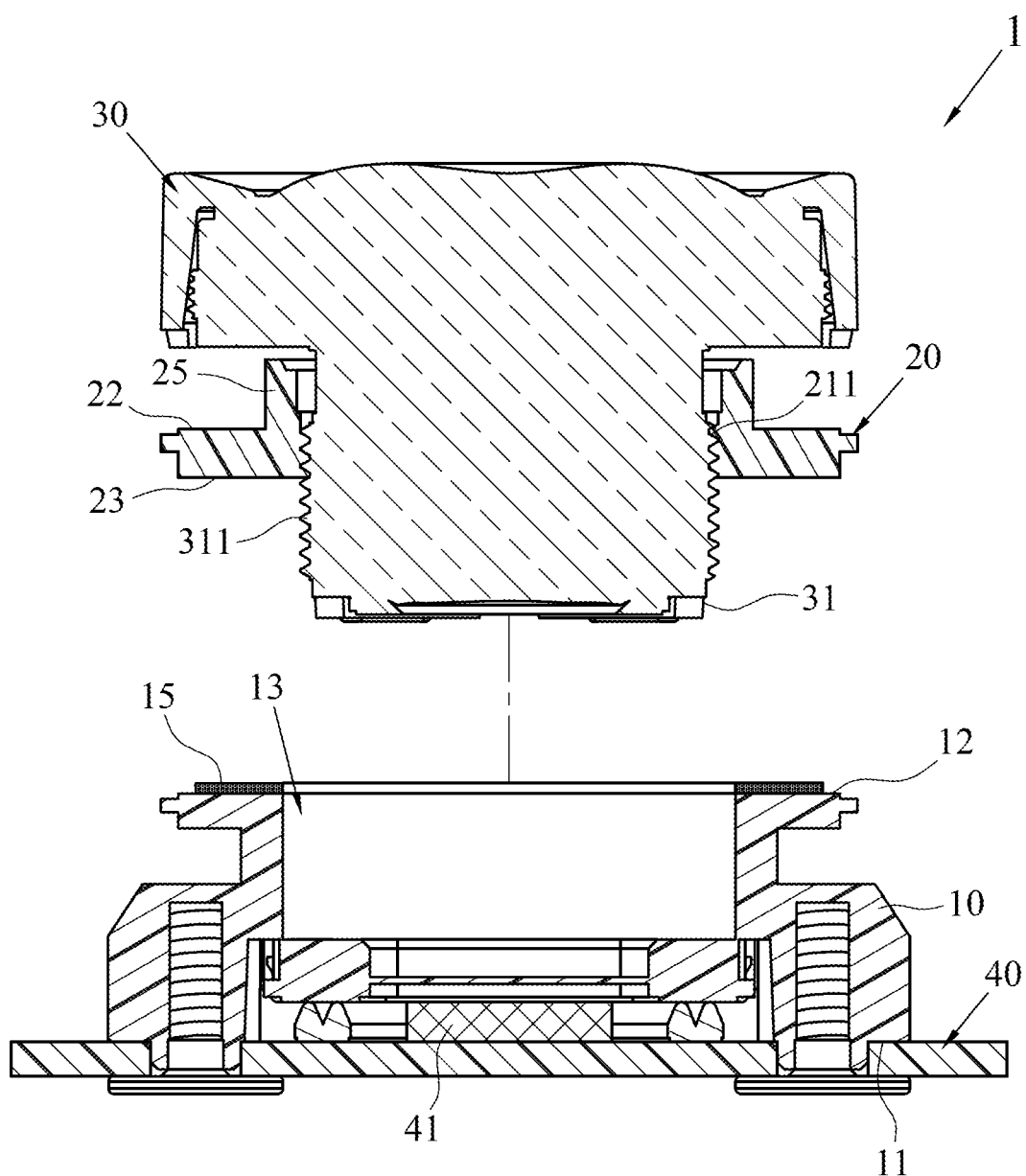
FIG. 5 illustrates an exploded, cross sectional view of the lens device according to an embodiment of the instant disclosure.

As shown in FIG. 4, the lens focusing method of the embodiment comprises the steps of a calibration procedure S01, a detection procedure S02, a focus procedure S03, and an adhering procedure S04. Please refer to FIG. 2 and FIG. 5. In the calibration procedure S01, a hollow base 10, a calibration ring 20, and a lens assembly 30 are prepared in advance. The hollow base 10 is first fixed on the circuit board 40. The assembly plane 12 of the hollow base 10 has a light curing adhesive layer 15 (e.g., UV light curing adhesive layer) annularly disposed thereon. The calibration ring 20 comprises a shaft hole 21, a first annular surface 22, and a second annular surface 23 axially opposite to the first annular surface 22. An inner wall of the shaft hole 21 has an internal thread 211. The lens assembly 30 comprises a lens barrel 31. The lens barrel 31 has an external thread 311. The lens assembly 30 can be screwed to the internal thread 211 of the calibration ring 20 by the external thread 311 of the lens barrel 31 in advance. As shown in FIG. 5, in an embodiment, a thickness of the calibration ring 20 is less than a thickness of the lens barrel 31, and a length of the external thread 311 is greater than a length of the internal thread 211; therefore, the lens barrel 31 can, but not limited to, be rotated related to the calibration ring 20 and be moved out of the second annular surface 23. In addition, the lens assembly 30 and the calibration ring 20 are detachably screwed to each other. For instance, the lens assembly 30 can be rotated clockwise to have the external thread 311 screwed to the internal thread 211 of the calibration ring 20. While the calibration ring 20 and the lens assembly 30 are against to each other, the lens assembly 30 can be further applied with force in a clockwise direction to have the calibration ring 20 and the lens assembly 30 fixed to each other. While the calibration ring 20 and the lens assembly 30 need to be detached, the lens assembly 30 can be applied with force in a counterclockwise direction to have the lens assembly 30 reverts to the state that the lens assembly 30 is rotatable related to the calibration ring 20.

As mentioned previously, as shown in FIG. 5, after the lens assembly 30 is screwed to the internal thread 211 of the calibration ring 20 by the external thread 311 of the lens barrel 31, the second annular surface 23 of the calibration ring 20 can be placed on the light curing adhesive layer 15 of the assembly plane 12 of the hollow base 10 such that the shaft hole 21 corresponds to the through hole 13 of the hollow base 10. Wherein, a hole diameter of the shaft hole 21 can be less than a hole diameter of the through hole 13. The lens barrel 31 of the lens assembly 30 can enter the through hole 13 and correspond to the light sensing component 41 on the circuit board 40. Next, the calibration ring 20 is adjusted related to the hollow base 10 to a calibrated position such that a predetermined imaging focus between the lens assembly 30 and the light sensing component 41 is maintained. In particular, because the light curing adhesive layer 15 is not yet cured by exposure to light, the position of the calibration ring 20 placed on the light curing adhesive layer 15 can still be adjusted related to the hollow base 10. For instance, the calibration ring 20 or the lens assembly 30 can be clamped by a robotic arm (not shown in the Figures) to perform motions related to the hollow base 10 such as vertically moving, traversing, tilting, deflecting, or rolling, so as to adjust a relative position of the lens assembly 30 and the light sensing component 41 to maintain the predetermined imaging focus and to have an optic axis of the lens assembly 30 be substantially perpendicular to a light sensing plane of the light sensing component 41 (i.e., to make sure that the light sensing component 41 or the lens assembly 30 does not incline to avoid blurring of corners of images). As shown in FIG. 3, while the adjustment of the calibration ring 20 is completed, the light curing adhesive layer 15 can be exposed to certain light. For instance, in a case that the light curing adhesive layer 15 is a UV light curing adhesive layer, the light curing adhesive layer 15 is exposed to UV light to make the light curing adhesive layer 15 pre-cured to avoid the displacement of the calibration ring 20. Finally, a bake process is performed on the pre-cured light curing adhesive layer 15 to have the light curing adhesive layer 15 thermally cured to form a curing adhesive layer 14, so as to have the calibration ring 20 fixed on the assembly plane 12 of the hollow base 10.

As shown in FIG. 4, the detection procedure S02 can be performed after the calibration procedure S01 and comprises: detecting the calibrated position to determine whether the lens assembly 30 is at a focus position. In particular, there is a chance that the issue of focus failure of the lens assembly 30 may still occur in the calibration procedure S01. For instance, after the pre-cure process or the bake process performed on the light curing adhesive layer 15, the property of the light curing adhesive layer 15 may change, which may result in a situation of slightly shift of the calibration ring 20; therefore, the distance between the lens assembly 30 and the light sensing component 41 may change, such that the issue of focus failure may occur. That is to say, the lens assembly 30 shifts from the focus position and the predetermined imaging focus of the lens assembly 30 and the light sensing component 41 is not maintained. The reason is not limited to the above description. The focus failure of the lens assembly 30 may be resulted from other factors (e.g., thermal expansion of the hollow base 10, the calibration ring 20, or the lens assembly 30). Therefore, after the calibration procedure S01, an optic instrument can be used for detection to determine whether the focusing of the lens assembly 30 succeeds.

As shown in FIG. 4, the focus procedure S03 can be performed after the detection procedure S02 and comprises: while the lens assembly 30 is not at the focus position, rotating the lens assembly 30 related to the calibration ring 20 to have the lens assembly 30 moved axially to the focus position. Please refer to FIG. 6. After the detection procedure S02, if the focus failure of the lens assembly 30 occurs and the lens assembly 30 is not at the focus position, the lens assembly 30 can be applied with force to have the lens assembly 30 loosed from the calibration ring 20, and the lens assembly 30 can be rotated such that the lens assembly 30 moved axially (represented by the arrow L1 in FIG. 6) related to the calibration ring 20 and the hollow base 10. As a result, the relative position of the lens assembly 30 and the light sensing component 41 can be further adjusted to maintain the predetermined imaging focus (i.e., the focus position).

As shown in FIG. 4, the adhering procedure S04 can be performed after the focus procedure S03 and comprises: filling an adhesive A between the external thread 311 and the internal thread 211 to fix the lens assembly 30 and the calibration ring 20. Please refer to FIG. 2 and FIG. 6. In an embodiment of the instant disclosure, the first annular surface 22 of the calibration ring 20 further has a convex rim 25. The convex rim 25 is around the shaft hole 21 and has at least one radial adhesive hole 24 disposed thereon. The radial adhesive hole 24 communicates with the shaft hole 21. As shown in FIG. 2, in the embodiment, the convex rim 25 is annular and is formed with the first annular surface 22 into one piece. Two radial adhesive holes 24 radially penetrate the convex rim 25 to communicate with the shaft hole 21. The two radial adhesive holes 24 are, but are not limited to, symmetric about the center of the shaft hole 21. In some embodiments, the convex rim 25 may be an annular block and be fixed on the first annular surface 22 of the calibration ring 20 in an assembling manner (e.g., adhering or coupling). In an alternative embodiment not shown in the Figures, the first annular surface 22 of the calibration ring 20 may not be provided with the convex rim 25. The radial adhesive hole 24 may radially penetrate the calibration ring 20 from a periphery surface 26 of the calibration ring 20 to the shaft hole 21.

Figure 6:
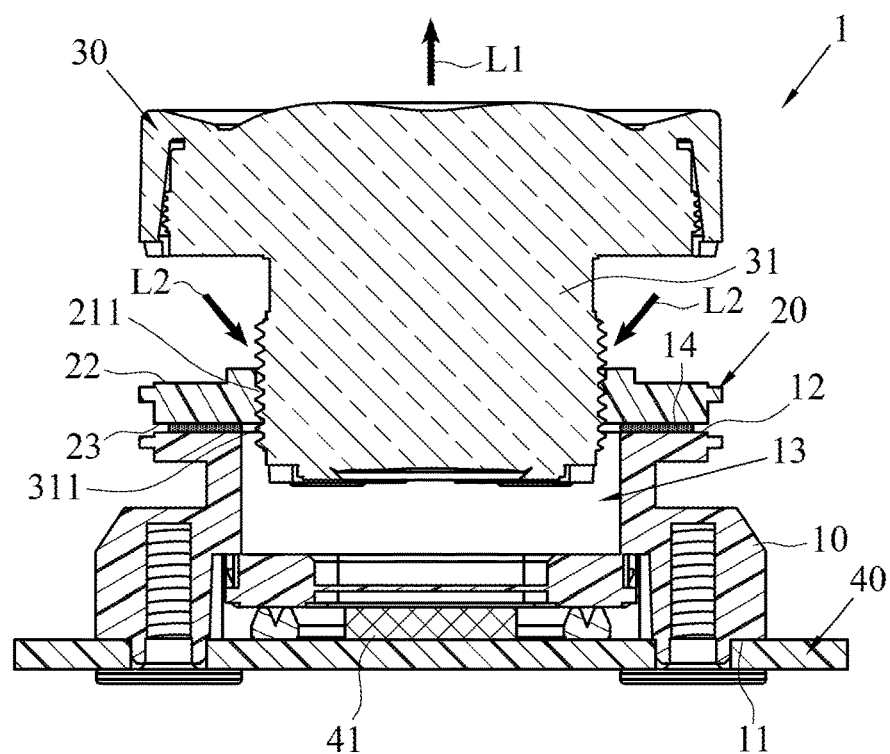
FIG. 6 illustrates a schematic diagram of focusing operation of the lens device according to an embodiment of the instant disclosure.
Figure 7:
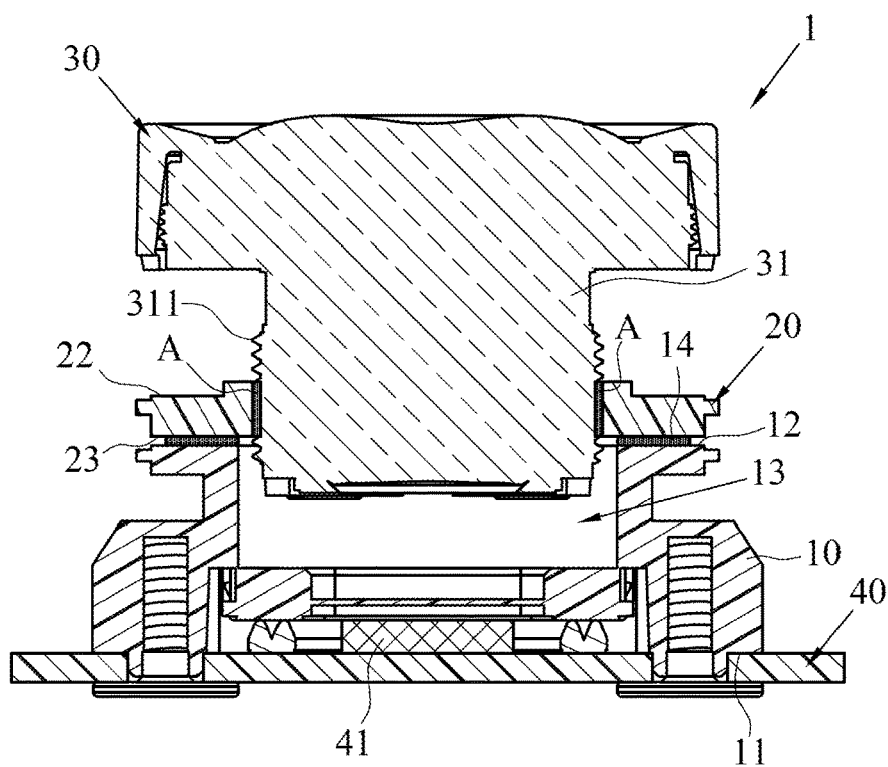
FIG. 7 illustrates a schematic diagram of adhering and fixation of the lens device according to an embodiment of the instant disclosure.

Based upon the embodiments, as shown in FIG. 6 and FIG. 7, when the lens assembly 30 is rotated related to the calibration ring 20 to be moved axially to the focus position, the adhesive A can be filled between the external thread 311 and the internal thread 211 (represented by the arrow L2 of FIG. 6) through at least one of the two radial adhesive holes 24, such that the lens assembly 30 is adhered to the calibration ring 20 and is fixed at the focus position.

Concisely, according to the embodiments of the lens device 1 and the lens focusing method of the instant disclosure, the lens barrel 31 of the lens assembly 30 is screwed to the internal thread 211 of the calibration ring 20 by the external thread 311, such that the calibration ring 20 is adjusted to a calibrated position and is fixed on the assembly plane 12 of the hollow base 10. As a result, while the calibrated position does not make the lens assembly 30 be at the focus position, the lens assembly 30 can still be rotated related to the calibration ring 20, such that the lens assembly 30 can be moved related to the calibration ring 20 and the hollow base 10 to adjust the focus. Alternatively, while the lens assembly 30 damages, the lens assembly 30 can be rotated and detached related to the calibration ring 20 and can be replaced by a new lens assembly 30. There is no need to discard the entire lens device 1; therefore, the cost can be decreased.

As shown in FIG. 4 and FIG. 7, in an embodiment, the adhesive A filled between the external thread 311 and the internal thread 211 in the adhering procedure S04 may be a super glue, an instant glue, or an epoxy resin glue. After the adhesive A is filled, the lens assembly 30 and the calibration ring 20 can be fixed without additional manufacturing process.

As shown in FIG. 4 and FIG. 7, in another embodiment, the adhesive A filled between the external thread 311 and the internal thread 211 in the adhering procedure S04 may be a light curing adhesive (e.g., a UV light curing adhesive). The adhesive A can be exposed to certain light while being filled. For instance, in a case that the adhesive A is a UV light curing adhesive, the adhesive A can be exposed to UV light to make the adhesive A pre-cured to avoid the displacement of the lens assembly 30. Finally, a bake process is performed on the pre-cured adhesive A to have the adhesive A thermally cured to have the lens assembly 30 and the calibration ring 20 fixed.

As shown in FIG. 6 and FIG. 7, in an embodiment, the calibration ring 20 may be a transparent ring. For instance, the calibration ring 20 may be made by transparent material (e.g., transparent acrylic or transparent plastic) and may be in a translucent state or in a transparent state. Certain light are able to pass through the calibration ring 20 to emit to the adhesive A, which facilitates the manufacturing process.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:
1. A lens device, comprising:
a hollow base comprising a bottom surface and an assembly plane opposite to the bottom surface, the assembly plane having a through hole;
a calibration ring comprising a shaft hole, a first annular surface, and a second annular surface axially opposite to the first annular surface, an inner wall of the shaft hole having an internal thread, the shaft hole corresponding to the through hole of the hollow base, and the second annular surface being fixed to the assembly plane of the hollow base via a curing adhesive layer; and
a lens assembly comprising a lens barrel, the lens barrel having an external thread, and the lens barrel being screwed to the internal thread of the calibration ring by the external thread;
wherein a thickness of the calibration ring is less than a thickness of the lens barrel, and a length of the external thread is greater than a length of the internal thread, so the lens barrel can be rotated related to the calibration ring and be moved out of the second annular surface.

2. The lens device of claim 1, further comprising a circuit board, wherein the circuit board has a light sensing component disposed thereon, and the bottom surface of the hollow base is fixed on the circuit board, and the light sensing component is in the hollow base.

3. The lens device of claim 1, wherein the calibration ring further has a radial adhesive hole, and the radial adhesive hole communicates with the shaft hole.

4. The lens device of claim 1, wherein the first annular surface of the calibration ring further has a convex rim.

5. The lens device of claim 4, wherein the calibration ring further has a radial adhesive hole, the radial adhesive hole communicates with the shaft hole, and the radial adhesive hole is disposed on the convex rim.

6. The lens device of claim 5, wherein the convex rim is annular.

7. The lens device of claim 5, wherein the convex rim is formed with the first annular surface into one piece.

8. The lens device of claim 1, wherein the calibration ring further has two radial adhesive holes each communicating with the shaft hole, and the two radial adhesive holes are symmetric about the center of the shaft hole.

9. The lens device of claim 1, wherein the calibration ring is a transparent ring.

10. A lens focusing method, comprising the steps of:
a calibration procedure: preparing a hollow base, a calibration ring, and a lens assembly, the hollow base comprising a bottom surface and an assembly plane opposite to the bottom surface, the assembly plane having a through hole, the calibration ring comprising a shaft hole, a first annular surface, and a second annular surface axially opposite to the first annular surface, an inner wall of the shaft hole having an internal thread, the lens assembly comprising a lens barrel, the lens barrel having an external thread, the lens barrel being screwed to the internal thread of the calibration ring by the external thread, the shaft hole of the calibration ring corresponding to the through hole of the hollow base, and the calibration ring being adjusted related to the hollow base to a calibrated position and being fixed on the assembly plane of the hollow base by the second annular surface via a curing adhesive layer;
a detection procedure: detecting the calibrated position to determine whether the lens assembly is at a focus position;
a focus procedure: while the lens assembly is not at the focus position, rotating the lens assembly related to the calibration ring to have the lens assembly moved axially to the focus position; and
an adhering procedure: filling an adhesive between the external thread and the internal thread to fix the lens assembly and the calibration ring;
wherein a thickness of the calibration ring is less than a thickness of the lens barrel, and a length of the external thread is greater than a length of the internal thread, so the lens barrel can be rotated related to the calibration ring and be moved out of the second annular surface.

11. The lens focusing method of claim 10, wherein in the calibration procedure, after the lens barrel being screwed to the internal thread of the calibration ring by the external thread, the calibration ring is adjusted related to the hollow base to the calibrated position and is fixed on the assembly plane of the hollow base by the second annular surface via the curing adhesive layer.

12. The lens focusing method of claim 10, wherein the calibration ring further has a radial adhesive hole, and the radial adhesive hole communicates with the shaft hole;
wherein the adhering procedure comprises: filling the adhesive between the external thread and the internal thread through the radial adhesive hole.

13. The lens focusing method of claim 10, wherein the first annular surface of the calibration ring further has a convex rim.

14. The lens focusing method of claim 13, wherein the calibration ring further has a radial adhesive hole, the radial adhesive hole communicates with the shaft hole, and the radial adhesive hole is disposed on the convex rim; wherein the adhering procedure comprises:
filling the adhesive between the external thread and the internal thread through the radial adhesive hole.

15. The lens focusing method of claim 10, wherein the calibration ring further has two radial adhesive holes each communicating with the shaft hole, and the two radial adhesive holes are symmetric about the center of the shaft hole; wherein the adhering procedure comprises: filling the adhesive between the external thread and the internal thread through the radial adhesive hole.

16. The lens focusing method of claim 10, wherein the adhering procedure further comprises: exposing the adhesive to light to cure the adhesive.

17. The lens focusing method of claim 16, wherein the calibration ring is a transparent ring, and wherein the adhering procedure the light passes through the calibration ring to emit to the adhesive.

18. The lens focusing method of claim 10, wherein in the calibration procedure further comprises: preparing a circuit board, the circuit board having a light sensing component disposed thereon, the bottom surface of the hollow base being fixed on the circuit board, and the light sensing component being in the hollow base.

19. The lens focusing method of claim 10, wherein in the calibration procedure, the calibration ring or the lens assembly is clamped by a robotic arm and moved related to the hollow base to have the calibration ring be at the calibrated position.

* * * * *